United States Patent
Pfefferle et al.

(10) Patent No.: US 6,442,963 B1
(45) Date of Patent: Sep. 3, 2002

(54) NON-CONDENSABLE PURGE TECHNIQUE USING REFRIGERANT TEMPERATURE OFFSET

(75) Inventors: Dean P. Pfefferle, Gilberts, IL (US); Michael B. Meeker, Kenosha, WI (US); Larry G. Moller, Harvard, IL (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/887,277

(22) Filed: Jun. 22, 2001

Related U.S. Application Data

(60) Provisional application No. 60/213,491, filed on Jun. 23, 2000.

(51) Int. Cl.⁷ .................................................. F25B 43/04
(52) U.S. Cl. ............................... 62/475; 62/144; 62/77; 62/474
(58) Field of Search ............................ 62/144, 77, 474, 62/475

(56) References Cited

U.S. PATENT DOCUMENTS

| | | | |
|---|---|---|---|
| 4,440,001 A | * 4/1984 | Vardi et al. ................... 62/475 |
| 5,167,126 A | 12/1992 | Cartwright |
| 5,369,959 A | 12/1994 | Pfefferle et al. |
| 5,400,613 A | * 3/1995 | O'Neal ......................... 62/195 |
| 5,465,590 A | 11/1995 | Van Steenburgh, Jr. et al. |
| 5,501,082 A | 3/1996 | Tachibana et al. |
| 5,515,690 A | * 5/1996 | Blackmon et al. ............. 62/85 |
| 5,544,492 A | 8/1996 | Manz |
| 5,582,019 A | * 12/1996 | Hanna et al. ................... 62/85 |
| 5,582,023 A | 12/1996 | O'Neal |
| 5,598,714 A | 2/1997 | Strout et al. |
| 5,664,424 A | 9/1997 | Olds |
| 5,671,605 A | * 9/1997 | Helterbrand .................. 62/85 |
| 5,806,328 A | * 9/1998 | Muston et al. ................ 62/149 |
| 5,906,106 A | 5/1999 | Brown et al. |
| 5,910,160 A | 6/1999 | Cakmakci et al. |
| 5,921,097 A | 7/1999 | Galbreath, Sr. |
| 5,943,867 A | * 8/1999 | Thomas et al. ................ 62/85 |
| 6,029,472 A | * 2/2000 | Galbreath, Sr. ............... 62/475 |
| 6,134,899 A | 10/2000 | Brown et al. |

* cited by examiner

*Primary Examiner*—William C. Doerrler
*Assistant Examiner*—Mark S. Shulman
(74) *Attorney, Agent, or Firm*—Seyfarth Shaw

(57) ABSTRACT

In a refrigerant recycling system non-condensables are purged from a recovery vessel which stores refrigerant recovered from a vehicular refrigeration system. A programmed controller controls operation of a purge valve for purging to atmosphere non-condensables in the recovered refrigerant in accordance with a purge routine, wherein the temperature in the recovery vessel is measured, and a look-up table is consulted to ascertain a target pressure corresponding to the measured temperature plus an offset, and the pressure in the recovery vessel is measured. If the measured pressure exceeds the target pressure, the purge valve is opened until the measured pressure drops to the target pressure. Immediately after a recovery operation, the purge routine is operated to purge the vessel to a target pressure based on an offset of 1° F. and, at a later time, after the vessel has cooled, the purge routine is operated to purge the vessel to a target pressure based on an offset of zero.

20 Claims, 2 Drawing Sheets

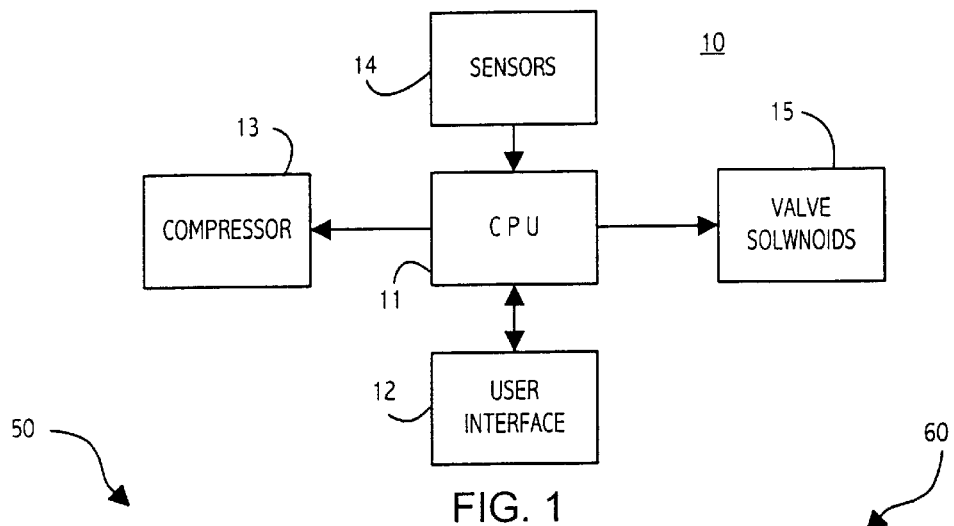
FIG. 1
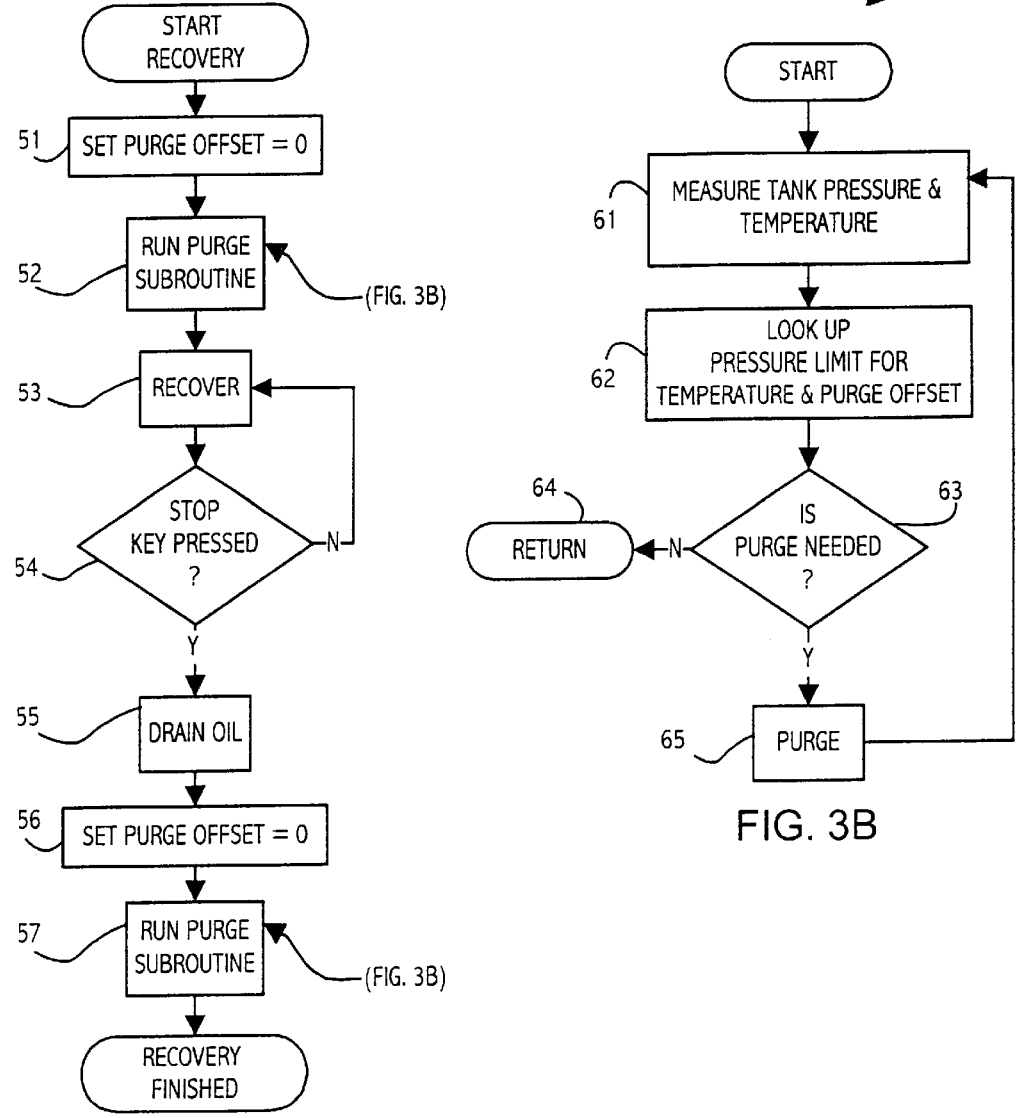
FIG. 3A
FIG. 3B

NON-CONDENSABLE PURGE TECHNIQUE USING REFRIGERANT TEMPERATURE OFFSET

RELATED APPLICATION

This application claims the benefit of the filing date of copending U.S. Provisional Application No. 60/213,491, filed Jun. 23, 2000.

BACKGROUND

This application relates to refrigerant handling systems and, in particular, to systems for recovering and recycling refrigerant from cooling systems, such as those of automotive vehicles. The application relates in particular to techniques and apparatus for purging non-condensables from the recovered refrigerant.

As used herein, "recover" means to remove used refrigerant from a refrigeration system and collect it in an appropriate external container or vessel. "Recycle" means to reduce the amount of contaminants in used refrigerants so that it can be reused.

During service or repair of refrigeration systems, such as automotive vehicle air-conditioning systems, the refrigerant charge in the refrigeration system is recovered and recycled, both to avoid pollution of the atmosphere and to minimize the increasing costs of disposal and replacement of the refrigerant charge. One type of impurity which must be removed from recovered refrigerant is non-condensable material, such as air, which can infiltrate the refrigeration system as a result of leaks or the like. The non-condensables can be vented to atmosphere, but care must be taken that, in the process, minimal refrigerant is vented, in order to ensure compliance with governmental pollution control regulations. It is known that refrigerants have characteristic saturation vapor pressures that vary as associated functions of temperature, as long as refrigerant is present in both liquid and vapor phases, such as in the refillable recovered refrigerant vessel of a refrigerant recycling system. If air or other non-condensables are present in the recovered refrigerant vessel, a differential pressure above the saturation pressure is created, which is proportional to the quantity of non-condensables present. This relationship is used for automatically venting the non-condensables. More specifically, an ideal pressure of the refrigerant at a given temperature is determined and, when the actual measured pressure of the refrigerant exceeds that ideal, a venting valve is opened. One such arrangement is disclosed, for example, in U.S. Pat. No. 5,369,959, the disclosure of which is incorporated herein by reference.

In the recovery vessel the recovered refrigerant exists both in liquid and gaseous phases. During recovery, the temperature of the gases at the top of the vessel increase, compared to the liquid in the vessel and also compared to the ambient air around the vessel, due to the heat of compression as the refrigerant gases are drawn through the compressor of the recovery system. In current high-performance recovery systems, the temperature of the gases in the tank may be significantly higher than the air temperature of the air surrounding the tank, and the tank wall itself, on which the temperature sensor is mounted. Thus, the temperature measured by the temperature sensor at the end of a recovery operation will be artificially low, resulting in a correspondingly low ideal vapor pressure and, accordingly, a wider pressure gradient between the measured pressure and the ideal pressure than actually exists, leading the system to conclude that more purging is required than necessary. This can lead to reduced efficiency of the recovery process due to over-purging.

If more time were allowed to pass before the purge process was started, the temperature of the gasses in the vessel would eventually drop to a value closer to that of the ambient air around the tank, decreasing the temperature gradient, so that the measured temperature would more accurately reflect the actual temperature of the gases, but during this time delay, some of the non-condensable gases would be allowed to be absorbed into the liquid refrigerant, which is undesirable.

SUMMARY

This application discloses a refrigerant recycling system with an improved non-condensable purge control which avoids the disadvantages of prior systems while affording additional structural and operating advantages.

An important aspect is the provision of a purge control technique which is effective with modem high-performance refrigerant recycling systems.

Another aspect is the provision of a purge control technique which can effectively and rapidly purge substantially all non-condensables in a recovered refrigerant volume while minimizing risk of over-purging.

Still another aspect is the provision of a purge control technique of the type set forth, which purges to a target pressure which is offset from the ideal vapor pressure corresponding to the measured temperature of the recovered refrigerant.

Certain ones of these and other aspects may be attained by providing apparatus for purging to atmosphere non-condensables from a volume of refrigerant, the apparatus comprising: a pressure transducer coupled to the volume for measuring the pressure therein; a temperature transducer disposed for measuring the temperature of gas in the volume; a purge valve coupled between the volume and atmosphere and operable between a closed condition isolating the volume from atmosphere and an open condition permitting exposure of the volume to atmosphere; and a processor operating under control of a stored program for controlling operation of the valve, the program including a purge routine responsive to measured temperature of the volume for determining an ideal vapor pressure in the volume corresponding to the measured temperature, the purge routine being responsive to measured pressure in the volume exceeding a target pressure above the ideal vapor pressure for effecting a controlled operation of the purge valve until the measured pressure drops to the target pressure.

Other aspects may be attained by providing apparatus of the type set forth in a refrigerant recovery system, and purging to the offset target pressure at the conclusion of a recovery operation and then purging to a non-offset target pressure at the beginning of the next succeeding recovery operation.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

FIG. 1 is a functional block diagrammatic view of a refrigerant recycling system;

FIG. 3A is a flow chart for the program routine of the central processor of the system of FIG. 1 during a refrigerant recovery operation; and FIG. 3B is a flow chart of a purge subroutine of the program of FIG. 3A.

DETAILED DESCRIPTION

Figure 2:
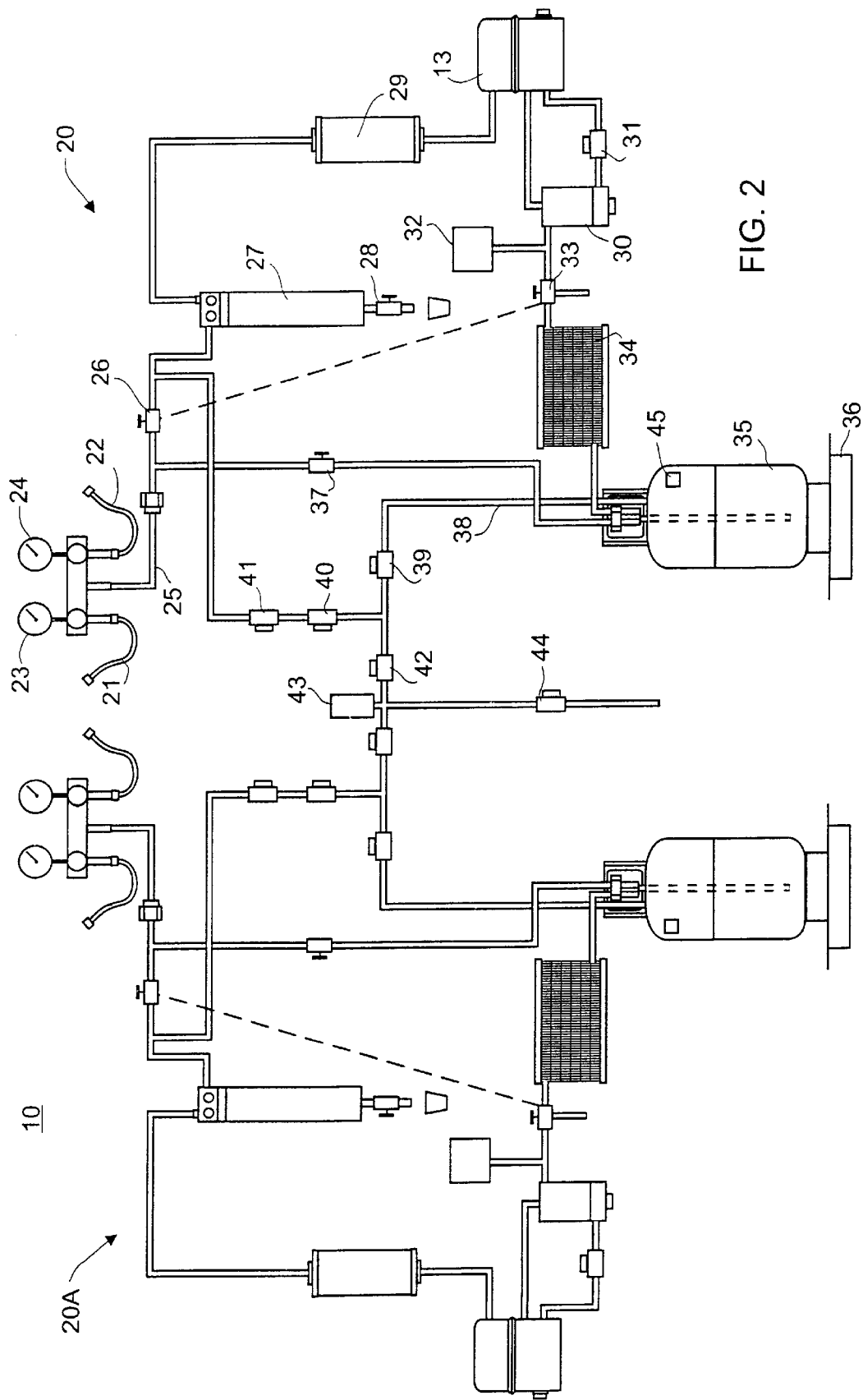
FIG. 2 is a fluidic schematic diagram of the refrigerant recycling system of FIG. 1.

Referring to FIGS. 1 and 2, there is illustrated a refrigerant recycling system, generally designated by the numeral 10. The system 10 includes a central processing unit ("CPU") 11 for controlling the operation of the system. The system 10 may be provided with a user interface 12, which may include a suitable keyboard or other data input device, and a suitable display or other data output device, all connected to the CPU 11. The system 10 includes a compressor 13, the operation of which is controlled by the CPU 11. The CPU 11 also includes input from sensors generally designated 14, which may include temperature and pressure sensors, and also controls the operation of the plurality of valve solenoids, generally designated at 15, all in a known manner.

Referring to FIG. 2, recycling system 10 is a dual system, including recycling units 20 and 20A which are substantially mirror images of each other, for respectively simultaneously servicing two different automotive vehicle refrigeration systems. Since the units 20 and 20A are substantially identical, only one will be described in detail. The unit 20 includes two service lines 21 and 22 adapted to be respectively connected to the low and high sides of an associated vehicle air conditioning system (not shown), the lines 21 and 22 being connected to a manifold to which are also connected low and high pressure gauges 23 and 24, respectively. The manifold is also connected by an input line 25 through a valve 26 to the input of an accumulator/separator 27, which has a drain valve 28 for draining off separated lubricant separated from the refrigerant. The output of the accumulator/separator 27 is coupled through a filter dryer 29 to the suction port of the compressor 13, the discharge port of which is connected to an oil separator 30, the reservoir of which is, in turn, coupled through a solenoid-operated valve 31 to the process port of the compressor 13. The oil separator 30 is also connected to a high-pressure cutoff switch 32 and through a valve 33, to the inlet of a condenser 34, the outlet of which is coupled to the inlet of a refrigerant recovery tank or vessel 35 which is mounted on a scale 36. The bottom of the recovery tank 35 is coupled through a recharge valve 37 to the input line 25 for charging recycled refrigerant back to the automotive air conditioning system, in a known manner. The top of the recovery tank 35 is coupled through a purge line 38, solenoid valves 39 and 40 and a check valve 41 to the inlet of the accumulator/separator 27. The solenoid valve 39 is also connected through a check valve 42 to a pressure transducer 43, and to the unit 20A. The valve 42 is also coupled through a purge valve 44 to atmosphere. A temperature sensor 45 is mounted on the wall of the recovery tank 35 adjacent to the upper end thereof for measuring the temperature of the gaseous content of the recovery tank 35.

The operation of the recycling unit 20 in recycling refrigerant from, and recharging refrigerant to, an automotive air conditioning system is known to those skilled in the art and will not be discussed herein in detail. In general, the pump of the compressor 13 draws refrigerant from the associated air conditioning system through the valve 26, the accumulator/separator 27, and the filter dryer 29, and discharges it through the oil separator 30 and the condenser 34 to the recovery tank 35. Before the recycled refrigerant can be recharged to the associated air conditioning system, non-condensables must be purged therefrom, and this is accomplished under control of the CPU 11 through a portion of a general recovery routine illustrated in FIG. 3A and a purge subroutine illustrated in FIG. 3B.

Referring to FIG. 3A, there is illustrated a recovery routine generally designated by the numeral 50. At the start of a recovery operation, the program first, at 51, sets a purge offset equal to zero. Then, at 52, the system runs the purge subroutine of FIG. 3B, to be described below, to remove from the recovery vessel 35 any excess non-condensables remaining from the previous recovery operation and then initiates the refrigerant recovery operation at 53. The routine then checks at 54 to see if a STOP key has been pressed by the operator to terminate the recovery routine. If not, the routine returns to 53 to continue the recovery operation. If the STOP key has been pressed, the routine then, at 55, drains oil from the oil separator 30 by opening the valve 31 and then, at 56, sets the purge offset equal to "X" and then again runs the purge subroutine at 57 to complete the recovery operation. The offset value "X" may be a predetermined temperature, e.g., 1° F.

Referring to FIG. 3B, there is illustrated the flow chart for the purge subroutine, generally designated 60. At the beginning of the purge subroutine, the program first, at 61, measures the temperature in the recovery tank 35, utilizing the temperature sensor 45, and then measures the pressure in the recovery tank 35 by opening the valve 39 to expose the pressure transducer 43 to the gases in the tank 35, and records the reading of the pressure transducer 43. Then, at 62, the program consults a look-up table stored in memory to determine the ideal vapor pressure, i.e., the vapor pressure if non-condensables in the tank were limited to a predetermined level not exceeding the levels referenced in applicable government regulations, for the measured temperature plus the purge offset. This represents a target pressure. If the offset is zero, the target pressure will be the ideal vapor pressure. If the offset is "X," the target pressure will be slightly higher than the ideal vapor pressure. Then, at 63, the program checks to see if a purge is needed by comparing the measured pressure in the tank 35 to the target pressure. If the measured pressure does not exceed the target pressure, then no purge is necessary and the program returns at 64 to the recovery routine 50. If the measured pressure exceeds the target pressure, then a purge is necessary and is executed at 65 by opening the purge valve 44 and conducting a controlled purge. The purge protocol is described in detail in the aforementioned U.S. Pat. No. 5,369,959. Essentially, the purge valve 44 is held open until the pressure measured by the pressure transducer 43 drops to the target pressure. Then the purge valve 44 is closed and the routine returns to 61 and, after a predetermined short delay, proceeds again through the loop to 63 to see if the measured pressure is still above the target pressure. If so, the purge valve is again opened. This cycle is repeated until the measured pressure when the purge valve 44 is closed drops to the target pressure, whereupon the routine returns at 64 to the main recovery program 50.

It is a significant aspect of the system 10 that, immediately after the conclusion of a recovery operation, the purge routine 60 is run with the purge offset set at "X." Thus, when the purge subroutine is run, at 62 the look-up pressure is for the measured temperature plus the offset value "X," i.e., an artificial temperature higher than that actually being measured by the temperature transducer 45 and, therefore, more closely approximating the actual temperature in the recovery tank 35 which, as was explained above, because of the heat of compression, will be higher than the temperature of the tank wall and the ambient air temperature. Thus, the purge routine run at the end of a recovery operation will purge to a pressure offset above the ideal pressure and remove most, but not necessarily all, of the non-condensables in the tank 35.

At the beginning of the next recovery operation, such as for servicing of the next automotive vehicle connected to the system 10, the purge routine will be run at 52 with the purge offset at zero, i.e., it will be run with a target pressure equal to the ideal vapor pressure corresponding to the temperature then being measured by the temperature transducer 45, which should be substantially the same as the actual temperature of the gases in the recovery tank 35, to remove any excess non-condensables still in the tank.

While, in the illustrated embodiment, the offset "X" is a temperature offset, it will be appreciated that the system could also be operated with a pressure offset which is added to the vapor pressure read from the look-up table. Also, while the above-described operation is in connection with an automotive refrigeration system, it will be appreciated that the principles explained above could be operable for recycling of refrigerant from other types of refrigeration systems.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. Apparatus for purging to atmosphere non-condensables from a volume of refrigerant, the apparatus comprising:

a pressure transducer coupled to the volume for measuring the pressure therein;

a temperature transducer disposed for measuring the temperature of vapor in the volume;

a purge valve coupled between the volume and atmosphere and operable between a closed condition isolating the volume from atmosphere and an open condition permitting exposure of the volume to atmosphere; and a processor operating under control of a stored program for controlling operation of the valve, the program including a purge routine responsive to measured temperature of the volume for determining an ideal vapor pressure in the volume corresponding to the measured temperature, the purge routine being responsive to measured pressure in the volume exceeding a target pressure above the ideal vapor pressure for effecting a controlled operation of the purge valve until the measured pressure drops to the target pressure.

2. The apparatus of claim 1, and further comprising a pressure transducer valve coupled between the volume and the pressure transducer and operable between a closed condition isolating the volume from a pressure transducer and an open condition exposing the pressure transducer to the volume.

3. The apparatus of claim 1, wherein the controlled operation of the purge valve includes opening the valve, closing the purge valve when the measured pressure drops to the target pressure, remeasuring the pressure in the volume with the purge valve closed and, if it exceeds the target pressure, again opening the purge valve until the measured pressure drops to the target pressure, and repeating this process until the measured pressure with the purge valve closed does not exceed the target pressure.

4. The apparatus of claim 1, wherein the apparatus is part of a refrigerant recovery system including a recovery vessel defining the volume and means for recovering to the volume refrigerant from an associated vehicular refrigeration system.

5. The apparatus of claim 4, wherein the program includes a refrigerant recovery routine for controlling a refrigerant recovery operation and for operating the purge routine at plural times during a recovery operation.

6. The apparatus of claim 5, wherein the target pressure is a first target pressure, the refrigerant recovery routine operating the purge routine at a first time to purge the volume to the first target pressure and operating the purge routine at a second time to purge the volume to a second target pressure equal to the ideal vapor pressure.

7. The apparatus of claim 5, wherein the first time is at the completion of a recovery operation and the second time is at the beginning of a next succeeding recovery operation.

8. Apparatus for purging to atmosphere non-condensables from a volume of refrigerant, the apparatus comprising:

pressure sensing means coupled to the volume for measuring the pressure therein;

temperature sensing means disposed for measuring the temperature of vapor in the volume;

purge means coupled between the volume and atmosphere and operable between a first condition isolating the volume from atmosphere and a second condition permitting exposure of the volume to atmosphere; and control means responsive to measured temperature of the volume for determining an ideal vapor pressure in the volume corresponding to the measured temperature, the control means including means responsive at a first time to measured pressure in the volume exceeding a first target pressure greater than the ideal vapor pressure for effecting a controlled operation of the purge means until the measured pressure drops to the first target pressure, the control means including means responsive at a second time to measured pressure in the volume exceeding a second target pressure equal to the ideal vapor pressure for effecting a controlled operation of the purge means to purge the volume to the second target pressure.

9. The apparatus of claim 8, wherein the control means includes a processor operating under control of a stored program, the program including determining the ideal vapor pressure from a look-up table stored in memory.

10. The apparatus of claim 8, and further comprising a pressure transducer valve coupled between the volume and the pressure transducer and operable between a closed condition isolating the volume from a pressure transducer and an open condition exposing the pressure transducer to the volume.

11. The apparatus of claim 8, wherein the apparatus is part of a refrigerant recovery system including a recovery vessel defining the volume and means for recovering to the volume refrigerant from an associated vehicular refrigeration system.

12. The apparatus of claim 11, wherein the first time is at the completion of a recovery operation and the second time is at the beginning of a next succeeding recovery operation.

13. The apparatus of claim 8, wherein the controlled operation of the purge valve in purging to a target pressure includes opening the valve, closing the valve when the measured pressure drops to the target pressure, remeasuring the pressure in the volume with the valve closed and, if it exceeds the target pressure, again opening the purge valve until the measured pressure drops to the target pressure, and repeating this process until the measured pressure with the purge valve closed does not exceed the target pressure.

14. The apparatus of claim 8, wherein the control means includes means for determining the target pressures by ascertaining from a look-up table a pressure corresponding to the measured temperature plus an offset value, the offset value for the first target pressure being a positive finite temperature and the offset value for the second target pressure being zero.

15. A method for purging non-condensables from a volume of refrigerant through a valve to atmosphere, the method comprising:

measuring the temperature of the volume, determining an ideal vapor pressure in the volume based on the measured temperature, measuring the pressure in the volume, comparing the measured pressure to a first target pressure greater than the ideal vapor pressure, controlling opening of the valve when the measured pressure exceeds the first target pressure until the measured pressure drops to the first target pressure, and at a later time again measuring the pressure in the volume and comparing the measured pressure to a second target pressure equal to the ideal vapor pressure and, if the measured pressure exceeds the second target pressure, controlling opening of the valve until the measured pressure drops to the second target pressure.

16. The method of claim 15, wherein the ideal vapor pressure is determined by ascertaining from a look-up table a pressure corresponding to the measured temperature.

17. The method of claim 15, wherein the first predetermined pressure is higher than the second predetermined pressure.

18. The method of claim 15, wherein the volume of refrigerant includes refrigerant recovered from an associated vehicular refrigeration system, the first time being at the end of a recovery operation and the later time being at the beginning of a next succeeding recovery operation.

19. The method of claim 15, wherein each of the controlling steps includes opening the valve until the measured pressure drops to a current target pressure, closing the valve, then remeasuring the pressure in the volume and, if it exceeds the current target pressure, again opening the valve until the measured pressure drops to the current target pressure, repeating the sequence until the measured pressure when the valve is closed does not exceed the current target pressure.

20. The method of claim 15, wherein each of the target pressures is determined by ascertaining from a look-up table a pressure corresponding to the measured temperature plus an offset value, the offset value for the first target pressure being a positive finite value and the offset value for the second target pressure being zero.

* * * * *

EX PARTE REEXAMINATION CERTIFICATE (8592nd)

United States Patent
Pfefferle et al.

(10) Number: US 6,442,963 C1
(45) Certificate Issued: Oct. 4, 2011

(54) NON-CONDENSABLE PURGE TECHNIQUE USING REFRIGERANT TEMPERATURE OFFSET

(75) Inventors: Dean P. Pfefferle, Gilberts, IL (US); Michael B. Meeker, Kenosha, WI (US); Larry G. Moller, Harvard, IL (US)

(73) Assignee: SPX Corporation, Charlotte, NC (US)

Reexamination Request:
No. 90/009,866, Feb. 23, 2011

Reexamination Certificate for:
Patent No.: 6,442,963
Issued: Sep. 3, 2002
Appl. No.: 09/887,277
Filed: Jun. 22, 2001

Related U.S. Application Data

(60) Provisional application No. 60/213,491, filed on Jun. 23, 2000.

(51) Int. Cl.
*F25B 45/00* (2006.01)
*F25B 43/04* (2006.01)

(52) U.S. Cl. .............................. 62/475; 62/144; 62/77; 62/474

(58) Field of Classification Search ......................... None
See application file for complete search history.

(56) References Cited

U.S. PATENT DOCUMENTS

| | | | |
|---|---|---|---|
| 4,180,986 A | 1/1980 | Shaw | |
| 4,484,453 A | 11/1984 | Niess | |
| 4,805,416 A | * 2/1989 | Manz et al. | .................. 62/292 |
| 5,094,087 A | 3/1992 | Gramkow | |
| 5,158,747 A | * 10/1992 | Manz et al. | .................. 422/98 |
| 5,172,562 A | 12/1992 | Manz et al. | |
| 5,172,572 A | 12/1992 | Ono | |
| 5,174,124 A | 12/1992 | Paige et al. | |
| 5,189,889 A | 3/1993 | Daily | |
| 5,199,271 A | 4/1993 | Ewer | |
| 5,218,834 A | 6/1993 | Major et al. | |
| 5,285,642 A | 2/1994 | Watanabe et al. | |
| 5,285,647 A | 2/1994 | Manz et al. | |
| 5,355,685 A | 10/1994 | Stie et al. | |
| 5,369,959 A | 12/1994 | Pfefferle et al. | |

FOREIGN PATENT DOCUMENTS

| | | |
|---|---|---|
| GB | 818788 | 8/1959 |
| JP | 06-300393 A | 10/1994 |

OTHER PUBLICATIONS

"A'Gramkow Instruction Reclaim Station—Type RE 1215", A'Gramkow A/S, Sonderborg, Denmark, 1987, 13 pages, with attachments, 12 pages dated Feb. 9, 1989, and 2 pages dated Jun. 15, 1998.

* cited by examiner

*Primary Examiner* — Sara Clarke

(57) ABSTRACT

In a refrigerant recycling system non-condensables are purged from a recovery vessel which stores refrigerant recovered from a vehicular refrigeration system. A programmed controller controls operation of a purge valve for purging to atmosphere non-condensables in the recovered refrigerant in accordance with a purge routine, wherein the temperature in the recovery vessel is measured, and a lookup table is consulted to ascertain a target pressure corresponding to the measured temperature plus an offset, and the pressure in the recovery vessel is measured. If the measured pressure exceeds the target pressure, the purge valve is opened until the measured pressure drops to the target pressure. Immediately after a recovery operation, the purge routine is operated to purge the vessel to a target pressure based on an offset of 1° F. and, at a later time, after the vessel has cooled, the purge routine is operated to purge the vessel to a target pressure based on an offset of zero.

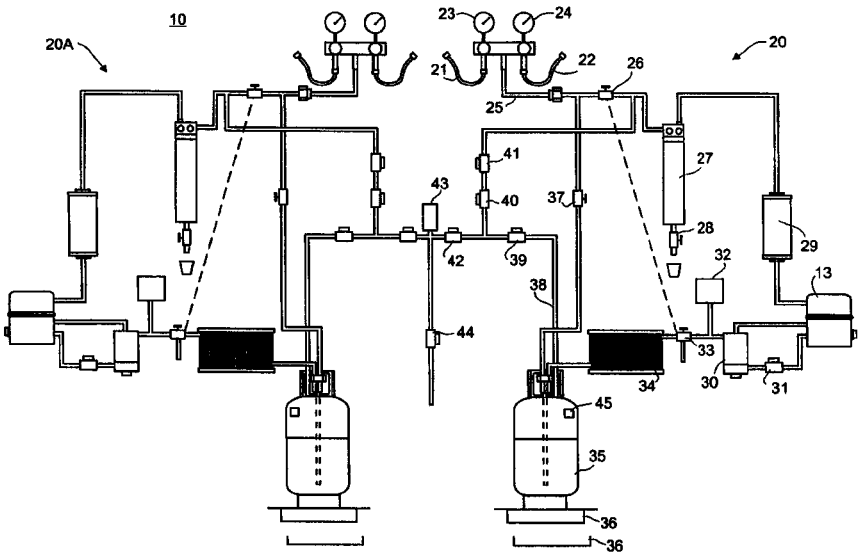

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3 and 7 are determined to be patentable as amended.

Claim 4, dependent on an amended claim, is determined to be patentable.

Claims 2, 5, 6 and 8-20 were not reexamined.

1. Apparatus for purging to atmosphere non-condensables from a volume of refrigerant, the apparatus comprising:
   a pressure transducer coupled to the volume for measuring the pressure therein;
   a temperature transducer disposed for measuring the temperature of vapor in the volume;
   a purge valve coupled between the volume and atmosphere and operable between a closed condition isolating the volume from atmosphere and an open condition permitting exposure of the volume to atmosphere; and
   a processor operating under control of a stored program for controlling operation of the valve, the program including
   a *first* purge routine, *executed after initiation of a refrigerant recovery operation of a recovery operation,* responsive to *a first* measured temperature of the volume for determining [an] *a first* ideal vapor pressure in the volume corresponding to the *first* measured temperature,
   the *first* purge routine being responsive to measured pressure in the volume exceeding a target pressure above the *first* ideal vapor pressure for effecting a *first* controlled operation of the purge valve until the measured pressure drops to the target pressure, *and*
   *a second purge routine, executed prior to initiation of a refrigerant recovery operation in a next succeeding recovery operation, the second purge routine being responsive to measured pressure in the volume exceeding a second ideal vapor pressure for effecting a second controlled operation of the purge valve.*

3. The apparatus of claim 1, wherein the *first* controlled operation of the purge valve includes opening the valve, closing the purge valve when the measured pressure drops to the target pressure, remeasuring the pressure in the volume with the purge valve closed and, if it exceeds the target pressure, again opening the purge valve until the measured pressure drops to the target pressure, and repeating this process until the measured pressure with the purge valve closed does not exceed the target pressure.

7. [The apparatus of claim 5.] *Apparatus for purging to atmosphere non-condensables from a volume of refrigerant, the apparatus comprising:*
   *a pressure transducer coupled to the volume for measuring the pressure therein;*
   *a temperature transducer disposed for measuring the temperature of vapor in the volume;*
   *a purge valve coupled between the volume and atmosphere and operable between a closed condition isolating the volume from atmosphere and an open condition permitting exposure of the volume to atmosphere; and*
   *a processor operating under control of a stored program for controlling operation of the valve,*
   *the program including a purge routine responsive to measured temperature of the volume for determining an ideal vapor pressure in the volume corresponding to the measured temperature,*
   *the purge routine being responsive to measured pressure in the volume exceeding a target pressure above the ideal vapor pressure for effecting a controlled operation of the purge valve until the measured pressure drops to the target pressure,*
   *wherein the apparatus is part of a refrigerant recovery system including a recovery vessel defining the volume and means for recovering to the volume refrigerant from an associated vehicular refrigeration system,*
   *wherein the program includes a refrigerant recovery routine for controlling a refrigerant recovery operation and for operating the purge routine at plural times during a recovery operation, and*
   wherein the first time is at the completion of a recovery operation and the second time is at the beginning of a next succeeding recovery operation.

* * * * *